March 17, 1970

K. W. PEARSON 3,500,859

FLUID LINE SELF-SEALING COUPLING

Filed March 22, 1967

Inventor:
Kenneth W. Pearson
By Baldwin, Wight, Diller & Brown, Attorneys

March 17, 1970  K. W. PEARSON  3,500,859
FLUID LINE SELF-SEALING COUPLING
Filed March 22, 1967  2 Sheets-Sheet 2
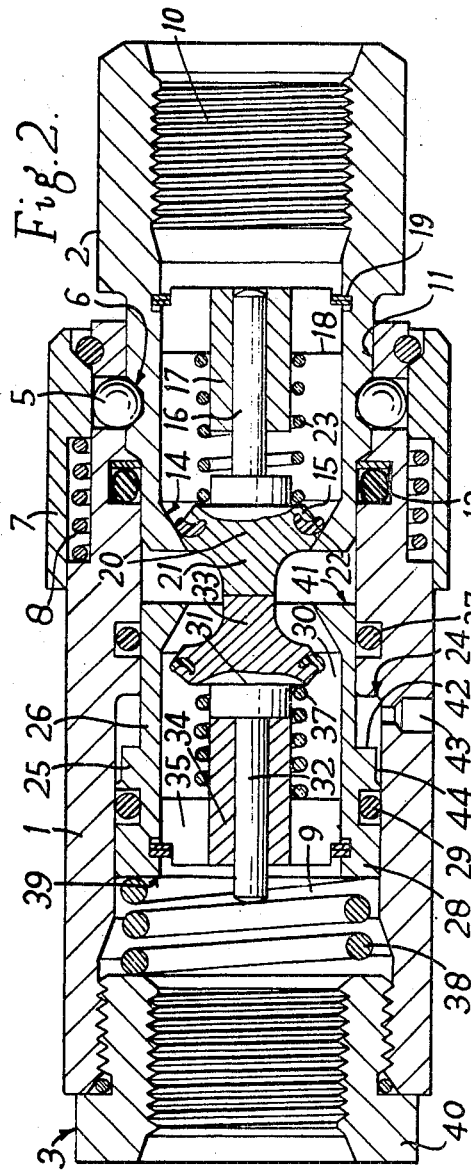
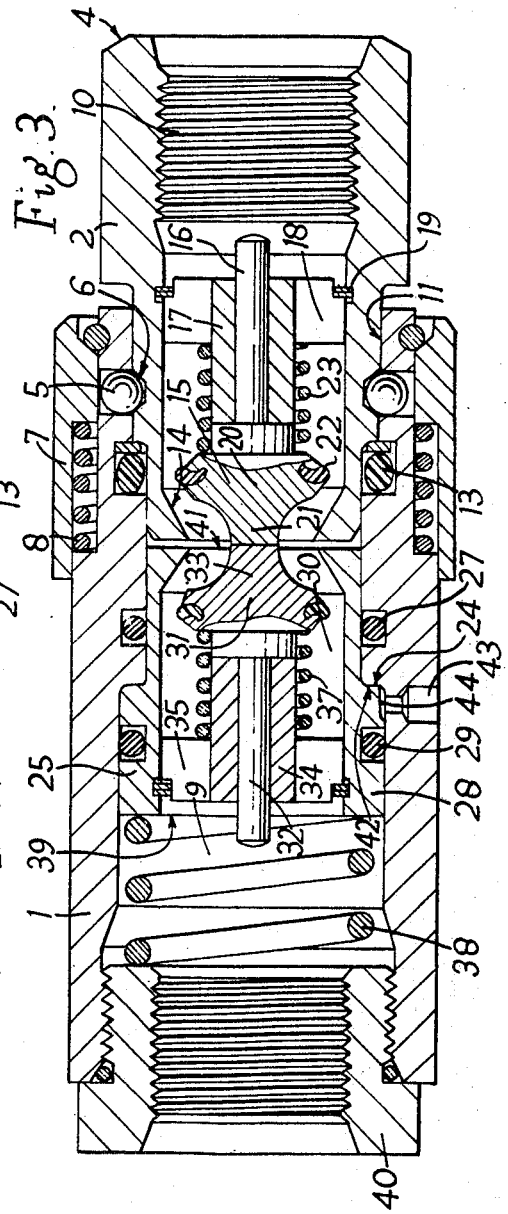
Inventor:
Kenneth W. Pearson
By Baldwin Wight Diller & Brown, Attorneys United States Patent Office
3,500,859
Patented Mar. 17, 1970

3,500,859
FLUID LINE SELF-SEALING COUPLING
Kenneth W. Pearson, Somerset, England, assignor to Exactor Sterling Limited
Filed Mar. 22, 1967, Ser. No. 625,169
Claims priority, application Great Britain, Mar. 29, 1966, 13,841/66
Int. Cl. F16l 37/28
U.S. Cl. 137—614.05          6 Claims

ABSTRACT OF THE DISCLOSURE

This disclosure relates to a fluid coupling defined by first and second body members each having means at remote ends for connection to associated conduits and means at adjacent ends for connection to each other, the first and second body members having respective first and second bores, a sleeve mounted for axial sliding movement in the first bore, the sleeve being housed entirely within the first bore between the connection means thereof, means for normally biasing the sleeve in a direction toward the second body member, first and second valve members in the sleeve and second bore respectively normally closing the same, cooperative means between the valve members for opening the same upon the connection of the body members to each other, the sleeve including axially oppositely facing radial end walls respectively adjacent and remote from the conduit connection means thereof, and the adjacent end wall being of a smaller surface area than the remote end wall whereby due to the differential areas fluid pressure is operative in a direction tending to urge the sleeve toward the adjacent end of the second body member.

---

This invention relates to fluid line self sealing couplings of the kind for connecting together a pair of conduits for carrying fluid under pressure and which comprises a pair of tubular body members which can be interconnected and locked together. Each of the body members is provided with check valve means operating in an internal bore, each of the valve means being biased towards an outward position in which they close the bore in which they are mounted. In this arrangement the first body member can be arranged to be connected to the source of fluid supply and the second body member to a conduit connected to the operating equipment. The first valve means are biased towards their closed position more strongly than the second so that when the connection is broken and fluid under pressure is retained in the conduit to which the second body member is connected, on re-connection the following action takes place. Because of the pressure fluid in the second body member the second valve means are heavily pressed against their seating and when the connection takes place the first valve means are initially moved rearwardly against the strong biasing. When the first valve means have been "cracked" the additional pressure now provided against the second valve means by the biasing of the first valve means plus the fluid pressure causes the second valve means to crack and to move rearwardly until a stop is reached, at which position both valve means are equally spaced from their seatings and the coupling is open to allow fluid to pass in either direction.

It is of the above kind of coupling that the present invention relates.

A disadvantage with this type of coupling is that when fluid is flowing under pressure from the first body member to the second, the second valve means are maintained tightly against their rearward stop and fluid flow is adequate. If there is a reversal of flow however, especially under heavy pressure, the pressure differential tends to allow the second valve means to move forwardly away from the stop and tend to close, and in certain circumstances complete closure can take place, the closing bias being accentuated the closer the valve means approaches the valve seat, despite the fact that the valve means are moving against the heavier biasing of the first valve means.

A further disadvantage is that when the coupling has been broken and fluid under pressure is carried in the second body member, the fluid pressure is increased slightly when the second valve member is moved back, thus the force required to "crack" this valve is increased and must be overcome by the first valve member.

According to one aspect of the present invention a coupling of the kind set forth includes means operated by fluid in the bore in the first body member for maintaining both valve means open after the initial join has been made and whilst the body members are connected together.

It will be understood that the fluid operated means in the first bore thus ensures that fluid flow can take place, even under heavy pressure in both directions through such a coupling.

According to another aspect of the present invention a coupling of the kind set forth includes means operated by the fluid in the bore in the first body member for increasing the force applied by the first valve means against the second to cause the second valve means to open when the first valve means reaches a predetermined rearward position.

In a preferred arrangement the first valve means includes a resiliently biased valve member mounted to control the bore in a movable sleeve in the bore in the body member, the rearward opening movement of the valve in the sleeve bore being restricted and the sleeve being biased by the effect of the fluid in the bore acting on differential areas thereon towards a forward position in which the first and second valve means are maintained in contact and open.

Conveniently the first bore and the sleeve are stepped so that the cross sectional area of the rearward end of the sleeve which is exposed to fluid pressure in the bore is greater than the cross sectional area of the forward end.

Sealing rings may be provided to seal both sides of the step in the bore and a passage extends from the bore and a passage extends from the bore between the sealing rings to relief.

Preferably the first valve member is biased towards its forward closed position in the sleeve bore by a spring which is weaker than a second spring which biases the sleeve towards a forward position.

Both valve means preferably include a poppet type valve member the head of which has an extension which engages the extension of the other when the coupling is connected and both valve heads may carry sealing rings to assist the metal to metal seal.

Any convenient arrangement may be provided to secure the two body portions together but preferably the connection is such that automatic release can take place under tension.

The invention can conveniently be applied to a coupling for use between an agricultural vehicle and an agricultural applicance, so that if the appliance becomes disconnected the fluid operating line will disconnect in a similar manner.

The invention may be performed in various ways but one embodiment will now be described by way of example and with reference to the accompanying drawings in which:

FIGURE 2 is a similar view to FIGURE 1 showing the body members when first connected, and, FIGURE 3 shows the coupling with its operative members in position to allow a fluid flow.

Figure 1:
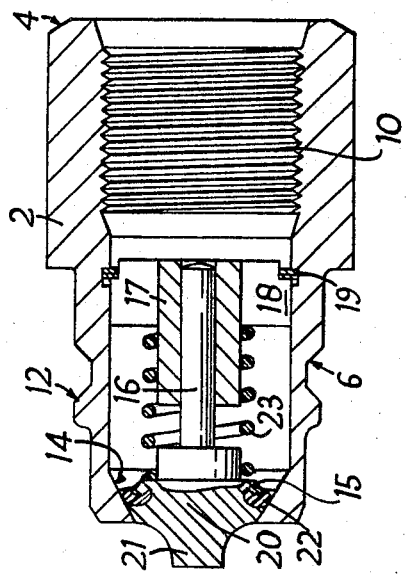
FIGURE 1 is a cross sectional side elevation of a coupling according to the invention with the body members disconnected.
Figure 1:
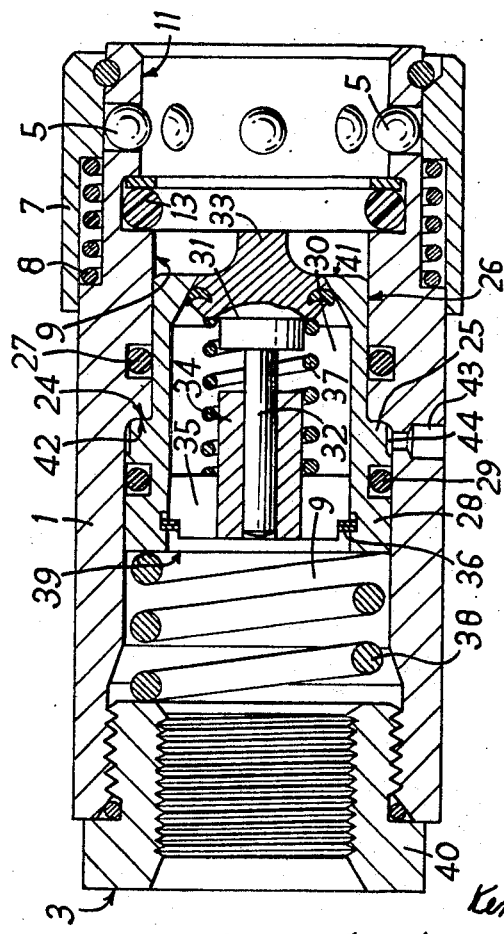

In the arrangement to be described and as shown in the drawings the coupling is for connecting the fluid line from an agricultural vehicle to a fluid operated implement and comprises a first body member 1 and second body member 2 both of which have means (not shown) for connection to conduits at their rearward ends indicated at 3 and 4 respectively and means for interconnection as a male and female joint at their forward ends. The connection between the body members 1 and 2 comprises a ring of balls 5 provided in shaped bores on the female body member 1 which can engage a suitable annual depression 6 in the male body member 2 when the two are placed together, a spring loaded annular slide 7 being provided around the outside of the balls 5 so that when the body members are connected the slide 7 will prevent the balls 5 from moving outwardly, and thus acting to lock the coupling together. The slide 7 is rigidly connected to part of the vehicle which is carrying the body member 1 so that if tension is applied to the coupling it tends to move relatively to the body member against the action of the spring 8 until a point is reached where the balls 5 move outwardly and the coupling becomes disconnected.

Each of the body members 1 and 2 are provided with an internal bore the first bore which is provided in the body member 1 being indicated at 9 and the second bore which is provided in the second body member 2 being indicated at 10. The first bore 9 is enlarged at 11 to provide the opening which receives the male portion 12 of the second body member 2 and the second bore 10 in the second body member extends throughout its length. The enlarged bore 11 of the first body member is provided with a sealing ring 13 so that when the joint is made sealing between the two body members is effected.

The forward outer end of the bore 10 in the second body member 2 is provided with a taper 14 against which a poppet valve, referred to herein as second valve 15 can seat. The rearwardly projecting stem 16 of this second valve 15 is carried in a guide 17 which is in turn held by a spider 17 located in the second bore 10 by a clip 19 and the head 20 of the valve is provided with an extension 21 which projects beyond the end of the bore 10. A sealing ring 22 is carried by the head 20 and engages the taper 14 to provide a tight seal. The valve 15 is biased towards its closed position as shown in FIGURE 1 by means of a coil spring 23 which surrounds the valve stem 16 and one end of which acts against the head 20 and the other end of which acts against the carrying spider 18. The first bore 9 in the first body portion 1 is stepped at 24 and carries a stepped sleeve 25 which is free to slid therein. The narrow part 26 of the stepped bore is provided with a sealing ring 27 and the larger diameter rearward part 28 of the stepped sleeve 25 is provided with a similar ring 29 so that the actual step 24 in the bore 9 between them is effectively sealed. The sleeve 25 is provided with a sleeve bore 30 in which a poppet valve, referred to herein as first valve 31, having a stem 32 and extension 33 similar to that carried in the second body portion 2 is carried, and in a similar manner utilising a guide 34, spider 35, clip 36 and spring 37. The sleeve 25 is biased towards a forward position by means of a coil spring 38 acting between its annular end face 39 and a bored locating plug 40 which screws into the rear end of the bore 9. This spring 38 is considerably stronger than the spring 37 which maintains the valve 31 in its forward position and this weaker spring 37 being of substantially the same strength as the spring 23 acting on the valve 20 in the second body member 2.

When the two body members 1 and 2 are coupled together and there is fluid under pressure in the bore 10 in the second body member 2 pressure in this bore acts against the back of the second valve 20 and thus causes it to push open the first valve 31 in the sleeve 25 in the first body member when the extensions 21, 33 of the two valves engage. The first valve 31 will move rearwardly until its head angles the end of the guide 34 which acts as a stop and further movement will be taken up by the stepped sleeve 25 moving rearwardly in the first bore 9 against the action of the strong spring 38 until the second body portion 2 is completely in position and locked by the balls 5 as shown in FIGURE 2. The first valve 31 will now be open and as working fluid pressure is applied against the head of the second valve 20 this too will be opened and the sleeve 25 will tend to move forward under the action of the strong spring 38. The fact that the cross sectional area of the rearward annular end face 39 of the sleeve is greater than the forward face 41 will tend to move the sleeve 25 towards its forward position until the step 24 in the bore is engaged by the step 42 on the sleeve. Thus the differential area sleeve 25 will act as a fluid operated ram, due to the fact that the area operated on by fluid in the bore 9 in the first body member is considerably greater than the area of the valve head 22 operated on by fluid in the bore 10 of the second body member 2 and the second valve 20 will be easily moved rearwardly despite the increase in pressure in the bore 10. It has been found that with siutable dimensions only half the fluid pressure may be required to open the valve, for example, it has been found that a fluid pressure of 3,000 lb. per square inch in the second body member 2 can be opened by only 1,000 lb. per square inch in the first.

The forward movement of the sleeve 25 and valve 31 thus pushes back the valve 20 so that voth valve members will now be pushed to a rearward position against their stops provided by guides 17 and 34, and will both be fully open. If the flow of fluid is now changed in direction and even if heavy pressures arrive there will be no tendency for either valve to close because both valve members are against their stops and cannot move in either direction and the fluid pressure itself will tend to hold the stepped sleeve 25 in its forward position as shown in FIGURE 1.

If the coupling is used with only light pressures in the fluid concerned then the strong spring 38 will always tend to move the stepped sleeve 25 towards its forward position when the coupling is made.

A passage 43 extends from the first bore 9 outwardly to relief from a point immediately to the rear of the step 24 and the stepped sleeve 25 is also provided with an annular depression 44 at this point so that a small annular chamber is provided. It has been found that if synthetic rubber material is used for seals a film tends to develop between the seals at high hydraulic pressures and the pressure in the film itself can become so high that operation of the sleeve 25 cannot take place. The passage 43 however, allows such a film to drain away and thus prevents it from affecting deflection of the stepped sleeve.

What we claim is:

1. A coupling comprising first and second body members each having means at remote ends for connection to associated conduits and means at adjacent ends for connection to each other, said first and second body members having respective first and second bores, a sleeve mounted for axial sliding movement in said first bore, said sleeve being housed entirely within said first bore between the connection means thereof, means for normally biasing said sleeve in a direction toward said second body member, first and second valve members in said sleeve and second bore respectively normally closing the same, cooperative means between said valve members for opening the first valve member upon the connection of said body members to each other, said sleeve including axially oppositely facing radial end walls respectively adjacent and remote from the conduit connection means thereof, said adjacent end wall being of a smaller surface area than said remote end wall whereby due to said differential areas fluid pressure is operative in a direction tending to urge said sleeve toward the adjacent end of said second body member causing the second valve member to open, a pair of axially spaced sealing means between said sleeve and said first bore, and said sealing means being also both located between said radial end walls.

2. The coupling as defined in claim 1 wherein said second body member includes a housing defining said second bore in which said sleeve is wholly housed, and said connection means of said second body member at the remote end thereof is carried by said housing whereby said sleeve is at no time subjected to loads created by conduits coupled to said first and second body members.

3. The coupling as defined in claim 1 including second biasing means for urging said first valve member toward said second body member, and said first-mentioned biasing means exerts a greater biasing force than said second biasing means.

4. The coupling as defined in claim 1 wherein said first and second valve members are poppet valves, and said cooperative means are defined by an axial extension of one of said poppet valves which engages an axial extension of the other of said poppet valves upon the connection of said body members to each other.

5. The coupling as defined in claim 1 wherein said first and second valve members include valve stems axially slidably received in guides carried by spiders secured in the respective sleeve and second bore.

6. The coupling as defined in claim 1 including means for relieving the area between said pair of sealing means to atmosphere whereby pressure build-up therebetween is prevented to thus prevent deflection of said sleeve and attendant loss of said fluid pressure differential.

References Cited

UNITED STATES PATENTS

| 2,966,371 | 12/1960 | Bruning | 137—614.04 X |
| 2,979,350 | 4/1961 | Lansky | 277—205 |
| 3,431,942 | 3/1969 | Kopaska | 137—614.05 |
| 2,735,696 | 2/1956 | Omon | 137—614.05 |
| 3,348,575 | 11/1967 | Simak | 137—614.05 |

ALAN COHAN, Primary Examiner
H. M. COHN, Assistant Examiner

U.S. Cl. X.R.
251—149.8